Patented Jan. 1, 1929.

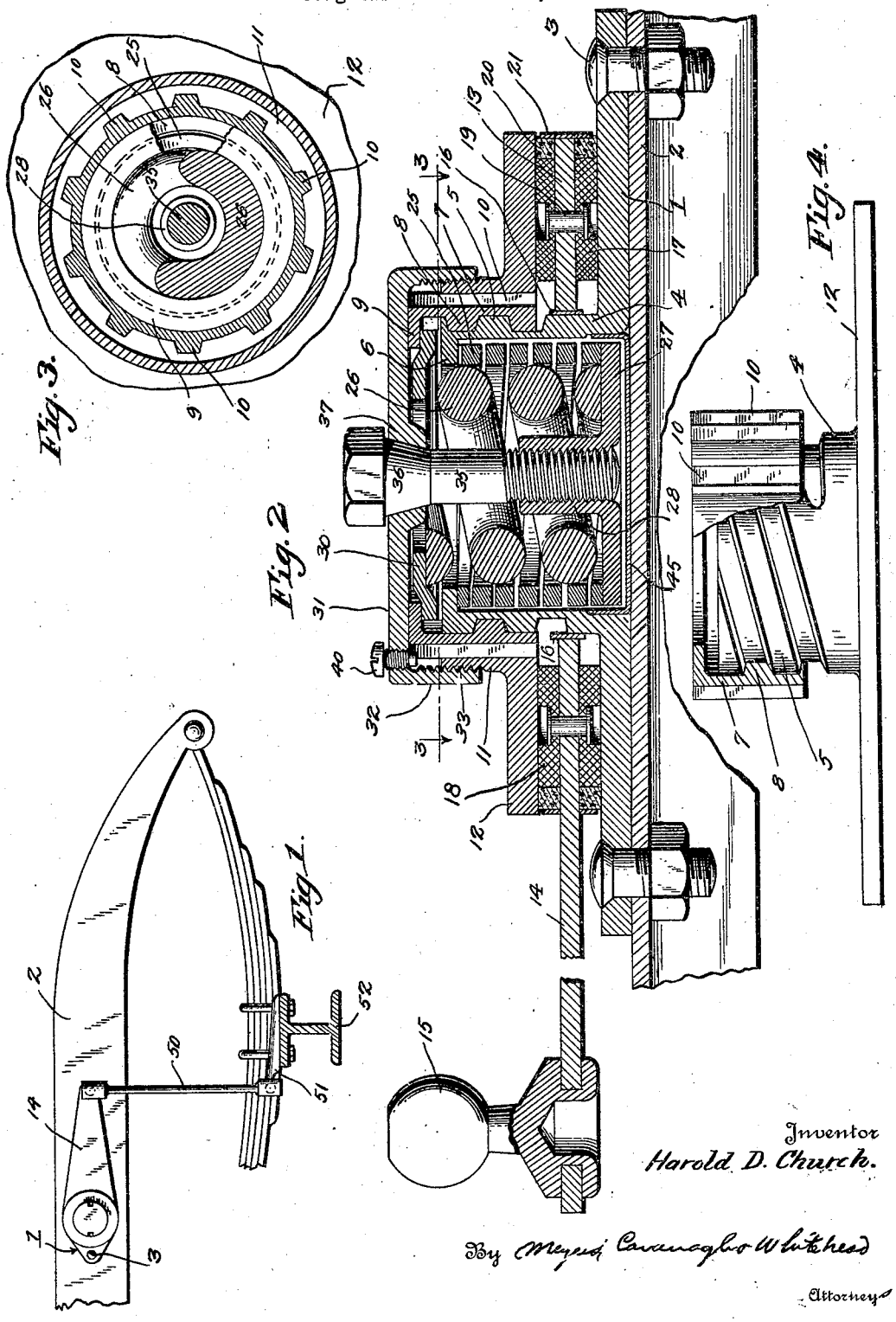

1,697,413

UNITED STATES PATENT OFFICE.

HAROLD D. CHURCH, OF FAIRFIELD, CONNECTICUT, ASSIGNOR OF ONE-THIRD TO CHARLES MARCUS, OF NEW YORK, N. Y., AND ONE-THIRD TO RAYMOND P. LANSING, OF MONTCLAIR, NEW JERSEY.

SHOCK ABSORBER FOR VEHICLES.

Application filed February 15, 1923, Serial No. 619,159. Renewed October 12, 1925.

This invention relates to shock absorbers or vehicle spring checks especially adapted for motor vehicles.

The general object of the invention is to provide a friction shock absorber which dispenses with any fluid media, is exceptionally strong, durable, compact, and is adapted for economical production.

An important object is to provide an appliance of this class which applies a predetermined maximum force to retard relative movement of the vehicle body and axle in a predetermined direction, either convergent or divergent, very quickly after the commencement of such movement, and to maintain the retarding force substantially constant throughout the remainder of the stated movement, thus avoiding difficulties encountered in many types of retarders in which the retarding force is built up gradually and the maximum force is applied only after the vehicle parts have moved a considerable distance and acquired substantial momentum.

A further object is to provide for applying a smaller but material retarding force to vehicle part movement in the direction opposite to the direction in which the maximum retarding force is applied, as above described.

Another object is to provide for an approximately or comparatively "free" period, or slight range of movement of the vehicle parts without considerable retarding effect within that range.

The invention involves the use of springs and co-operating inclined surfaces, and an important object is to provide structures or arrangements of parts in which the frictional retarding effect depends mainly upon the spring pressure, the inclined or screw surfaces being used principally or entirely to control the spring pressure. In one preferred embodiment of the invention I provide two springs, one of which exerts a friction-producing effect in both directions of shock-absorber movement, and the other exerts its maximum friction-producing effect in only one direction of movement and no friction-producing effect in the other direction of movement.

An important purpose of the invention is to improve the structural features of devices of this class in various ways, with the objects of manufacturing ease and economy and increased strength, durability, and improved operation of the appliance. One important feature is the substantial enclosure of the spring means within the inclined-surface or screw and nut mechanism. Other structural features are sufficiently referred to hereafter.

The characteristics and advantages of the invention are further sufficiently explained in connection with the following detail description of the accompanying drawings, which show one exemplifying embodiment of the invention. After considering this embodiment it will be evident that many variations may be made within the principles of the invention, and I do not limit myself to details except as claimed.

Figure 1 is a side elevation of sufficient parts of a motor vehicle to indicate one arrangement of the shock absorber or vehicle spring check thereon.

Figure 2 is a longitudinal section of the shock absorber attached to a side frame member of a motor vehicle.

Figure 3 is a section at 3—3, Fig 2.

Figure 4 is a detail view, partly in plan and partly in section, of the main plate with its screw-sleeve, and the nut.

A friction plate 1, which is the main plate or base of the appliance, is arranged to be secured to a frame web 2 of a motor vehicle by bolts and nuts 3. Centrally located on plate 1 is a sleeve 4 of substantial diameter and most desirably integral with the plate. The sleeve, which may be described as a screw-sleeve or hollow spindle, has an external screw thread 5. In one instance the pitch or lead angle of the thread is 15°, but this angle may be varied within proper limits for the purposes in view. At its outer end sleeve 4 has an inwardly projecting flange 6. A nut 7 is located upon the screw-sleeve in engagement with screw thread 5. The nut may be defined in some instances as a shifter since by a shifting movement it throws a spring into and out of action as explained hereafter. At its outer end the nut has an inwardly projecting flange 9. The periphery of the nut is provided with a multiplicity of splines 10 cooperating with spline-ways or channels in a sleeve 11, which is an operative part of and usually integral with a plate 12. Plate 12 may be defined in some instances as a pressure member or pressure plate.

Between plates 1 and 12 is a movable friction plate 13 which has a lever arm 14 of suitable length provided with a ball-end fitting 15. Plate 13 is apertured to accommodate screw-sleeve 4, and in the aperture is secured a bushing 16 which provides a bearing for the plate upon the sleeve adjacent to plate 1. Annular friction disks or rings 17 and 18 of any suitable friction material are located between plates 1 and 13 and 13 and 12 respectively, and most desirably these friction rings are secured to plate 13 as by rivets 19 having heads located in counter-sinks in the disks. Filler rings 20 of cork or other suitable material may be placed about the peripheries of the friction rings to exclude dirt, and the spaces between plates 1, 13 and 12 may be additionally covered and the filler rings secured by a thin metal ring 21 secured to plate 13 and having a slot at one side to accommodate lever arm 14.

Within the screw-sleeve 4 are located two helical springs 25 and 26, of which spring 26 is usually heavier than the other, that is to say, is calculated to exert a greater end thrust, and this heavy spring is usually located within the other. The inward ends of both springs rest against an abutment or washer 27 having an internally threaded sleeve 28. The outer end of spring 25 rests against flange 6. The outward end of spring 26 rests against a washer 30. The peripheral margin of the washer rests against flange 9. A cap 31 fits over and encloses the outer end of the mechanism. This cap has a cylindrical flange 32 internally threaded to engage a screw thread 33 on sleeve 11. A bolt 35 passes through a central aperture in the cap 31 and the threaded portion of the bolt engages in the threaded sleeve 28. The bolt may have a tapered shank portion 36 engaging a tapered socket 37 in cap 31, or it may be prevented from rotating by other means.

A retractable stop in the form of a screw 40 may be provided in cap 31, the inner end of this screw being arranged to engage between the splines 10 of nut 7, or instead of this screw a rigid projection on the inner face of the cap in substantially the same location as the screw end may be used. When desired the inner end of the chamber within sleeve 4 containing the springs may be closed or sealed in any suitable way, for example, by a flanged disk 45 forced into the inward end of the sleeve with a friction fit.

Figure 1 shows one application of the appliance to a motor vehicle. The ball end 15 of arm 14 is connected by a link 50 to any suitable fitting 51 secured to the vehicle axle 52. The appliance may be arranged to exert the maximum retarding effect in either direction of relative movement of the vehicle frame and axle by reversing its position or by changing the lead of the threads of the screw sleeve and nut.

As shown, the appliance is arranged to apply the greatest resistance to vehicle spring recoil. Supposing that the vehicle spring has been compressed by an upward movement of the axle in relation to the frame, at the end of that movement the parts will be in the position shown in Figure 2. There is a slight clearance between the outer portion of washer 30 and the end of sleeve 4, to allow for wear of the friction surfaces. The clearance between the washer and the sleeve end may be varied by rotating the cap 31 in relation to friction plate 12, and this may be done when stop 40 is retractable by merely moving out the stop, or if the stop is fixed, the cap 31 may be turned by first backing out the bolt 35 a suitable distance and then moving plate 12 with its sleeve 11 and cap 30 outwardly slightly until the stop is free from the outer ends of splines 10.

During the vehicle spring recoil lever arm 14 moves clockwise as viewed from the outward end of the appliance, or away from the eye in Figure 2. During the first part of this movement the frictional contact between the inner face of plate 12 and friction ring 18 causes plate 12 to move along with arm 14. Friction ring 17 slides on the surface of plate 1. The frictional resistance to this movement is that due to the thrust of spring 25 abutting against flange 6 and re-acting against washer 27 which in turn pulls down bolt 35 and through cap 31 applies pressure to plate 12. This condition continues during such small angle of movement of arm 14 as is necessary to take up clearance of the screw threads 5 and 8, or in other words, to bring the outward surfaces of the nut threads 8 in contact with the inward surfaces of the sleeve threads 5. During the described movement the nut is of course compelled to move along with plate 12 by the spline connection between sleeve 11 and the nut. The frictional resistance to the described movement of course depends upon the "strength" or thrust of spring 25 which may be varied greatly, and may be in one specific instance about 250 pounds, more or less. In such a case the resistance to sliding during the described arm movement and with an arm of a certain suitable length may be only approximately 22.5 pounds at the end of the arm, or in other words, a 22½ pound resistance to the initial spring recoil movement. This corresponds approximately to an initial free period or angle of movement.

When the screw thread clearance has been taken up arm 14 continues to carry plate 12 along with it by frictional contact, with sliding friction only between friction ring 17 and plate 1 during another small angle of movement, during which the angle of the right hand screw threads 5 on sleeve 4 causes nut 7 to move inward or toward plate 1. Until this inward movement of nut 7 commences the thrust of spring 26 is entirely taken up between cap 31 which is in immediate contact with nut flange 9 and washer 30 which is in immediate contact with the flange, and washer 27 which is connected to cap 31 by bolt 35; or in other words, the thrust of spring 26 is self-contained and eliminated as an operative feature. Immediately, however, that the described lever movement causes nut 7 to be drawn inward, the outer end of the nut leaves contact with cap 31 and the thrust of spring 26 is applied between the nut 7 through its flange 9 and washer 30, and washer 37, and so through bolt 35 and cap 31 to plate 12 and through the friction disks and plate 13 to the surface of friction ring 17 which is sliding on plate 1. The inner spring 26 may be and is usually made to have a considerably greater thrust value than spring 25. This thrust may be in one particular instance approximately 900 pounds, more or less, and during the described part of the recoil movement this pressure added to the thrust of spring 25 and exerted on a single sliding surface, may produce a pull at the end of arm 14 of approximately 119 pounds. This retarding effect exerted between the vehicle frame and axle takes into consideration the resistance of the splines 10 to the inward sliding movement of the nut during the described movement of arm 14. The spline faces are under pressure and therefore exert an appreciable resistance to the sliding movement, which may be taken into consideration in the calculation of the angle of screw thread 5 and the pressures of one or both springs.

At the end of the described small angle of movement further inward movement of the nut is prevented by contact of washer 30 with the outer end of sleeve 4. Immediately thereupon, any rotative movement of the nut and of sleeve 11 with plate 12 is stopped and in the further movement of arm 14 sliding friction is provided at two points, that is, between plate 1 and friction ring 17 and between plate 12 and friction ring 18. This practically doubles the resistance to the vehicle spring rebound applied through link 50 at the end of arm 14, or in one specific instance, with springs and other factors as above, resistance during the remaining part of vehicle spring recoil will be approximately 236 pounds.

In many cases, and especially in all cases where the deflection of the vehicle spring has been so considerable as to make the checking of the recoil important, the angle of movement of arm 14 after both springs have come in play to exert their full friction effect, and after slipping commences between both of the friction rings and the adjacent plates, is by far the greater part of the entire recoil movement, or in other words, the first two small angular portions of movement of arm 14 during which only the lighter spring has any frictional effect and during which the combined spring thrust is divided in half by the fact that sliding friction is exerted at only one point, are only a small part of the total recoil movement. The first small angular movement where the friction resistance is at a minimum, therefore, corresponds approximately to a free period or angle of movement during which the friction resistance is very moderate; in the next small angular movement the resistance becomes considerable but only approximately one-half of the maximum; and then practically instantly, and after only a small part of the total angular recoil movement of arm 14, the full friction resistance is built up and maintained throughout the remainder of the recoil stroke. The result of this is that the moving parts of the vehicle do not have time to gain great momentum force until the full retarding effect is applied and the checking of the recoil action is therefore very effective with reasonable frictional resistance, whereas, as in other types of retarders, when the moving parts of the vehicle such as the axle structure and the body are permitted to reach a fairly rapid rate of movement before the principal retarding force is applied, the momentum effect is correspondingly increased and the force that must then be applied to check the movement is increased in an even greater ratio.

When the road wheel of the vehicle encounters an obstacle tending to move the axle upward in relation to the frame, arm 14 moves counter-clockwise or toward the observer in Fig. 2. In the first part of this movement, if it occurs immediately after a recoil movement which causes the nut to be moved inward until stopped by contact of washer 30 with the end of sleeve 4, as above explained, the nut is "unscrewed" or rotated counter-clockwise until its outer end comes in contact with cap 31, by reason of the frictional engagement between plate 12 and friction ring 18 which causes plate 12 and the nut to move along with arm 14. During this angle of movement sliding friction occurs only between friction ring 17 and plate 1. The resistance of the splines 10 to outward movement of the nut during the described arm movement tends to reduce the pressure on the friction disks. The pull at the end of arm 14 during the described movement due to the thrust of the two springs and the spline resistance, is fairly moderate, somewhat less in a particular instance than friction resistance during the second small angular movement of recoil as above described, or in other words, in a specific case about 87.5 pounds, more or less. As soon as the nut comes in contact with cap 31 the thrust of spring 26 is again self-contained and negligible during the further movement of arm 14 in the described direction.

Resistance to further compression of the vehicle spring is therefore that due to the thrust of spring 25 exerted upon two sliding surfaces, that is, the surfaces of both friction rings 17 and 18 in contact with the respective plates 1 and 12, since sliding commences between plate 12 and the adjacent friction ring as soon as outward movement of the nut stops. The thrust effect of the spring is, however, during the remaining part of the arm movement reduced by the angularity of the screw thread 5, since plate 12 with its sleeve engaging nut 7 through the splines, tends to rotate the nut backward and thus to reduce the effective spring thrust, so that the frictional force tending to check the vehicle spring compression during the great part of the compression stroke may be very small, the force applied at the end of arm 14 being in a particular example about 20 pounds, more or less.

The spring pressure and pull values stated are of course only one example, and are given mainly for ready comparison of the forces applied to the movable friction plate and lever arm under the various operative conditions. The spring pressures and resultant forces may be varied within wide limits, with respect to the different classes and weights of vehicles, and the amount of retardation desired.

From the above description it will be evident that the maximum pull at the end of arm 14 is a function of the two spring pressures plus the resistance of the splines 10 to sliding, and that the latter is only a small percentage of the total pressures involved. In the particular example above mentioned, a variation of 100% in the co-efficient of friction of the splined surfaces only varies the maximum pull on arm 14 six per cent. The operation of the appliance therefore is very consistent in spite of more-or-less variations in the finish of the spline surfaces.

The pitch of the screw thread 5 is made sufficiently fine so that irrespective of the co-efficient of friction on the screw surfaces there is at all times an excess of "winding up" power due to the thrust effect of spring 25, and the friction effect, so that variations in the screw thread co-efficient of friction have no appreciable bearing on the pull exerted at the end of arm 14. The angle of the screw thread is always made steeper than the angle of repose of the material used, in order to eliminate any possibility of the nut 7 jamming against the end of sleeve 4 and failing to unscrew.

The appliance is designed to operate with or without lubrication, and the washers surrounding the friction rings and the covering of the inner end of sleeve 5 prevent the entrance of water and dirt.

I claim:

1. A vehicle spring controlling appliance comprising relatively movable friction members, a spring normally inactive, and means controlled by a relative movement of the members and adapted to establish an active cooperation between the spring and the friction members to thereby apply pressure to their frictional contact, said controlling means including a shifter having a rotary and longitudinal movement and actuated by one of said friction members and adapted when moved longitudinally to establish such active cooperation between the spring and the friction members.

2. A vehicle spring controlling appliance, comprising relatively oscillatable friction members, a spring for producing frictional contact of the members, means normally maintaining the spring in effective condition, and means controlled by a relative movement of the members to make the spring active for the purpose stated or to render it ineffective for that purpose.

3. A vehicle spring controlling appliance, comprising relatively movable friction members, a shifter, inclined surfaces effective between the shifter and one of said members to move the shifter upon movement of said member, a spring in opposed relation to the shifter, and a spring abutment, the parts being arranged so that when the shifter is moved in one direction, the spring is effective to provide friction pressure between said members and when the shifter moves in the other direction the spring thrust is taken up between the abutment and a fixed part of the appliance and is ineffective to produce friction pressure.

4. A vehicle shock absorber or spring retarder comprising a friction member, a shifter mounted for relative movement on said member, a second friction member arranged for oscillation and co-operating with said shifter and adapted, when rotated, to move the shifter longitudinally, a third friction member arranged for rotative movement between the first and second friction members, and a yielding pressure means adapted to exert yielding pressure against the shifter when so moved longitudinally.

5. A vehicle shock absorber or spring retarder comprising a friction member, a shifter mounted for relative movement on said member, a second friction member arranged for oscillation and co-operating with said shifter and adapted, when rotated, to move the shifter longitudinally, a third friction member arranged for rotative movement between the first and second friction members, a yielding pressure means adapted to exert yielding pressure against the shifter when so moved longitudinally, and a yieldable controlling means acting on a friction member.

6. A vehicle shock absorber or spring retarder comprising a friction member, a spindle member thereon, a shifter mounted for movement on the spindle member, a second friction member mounted for rotation and co-operating with said shifter and adapted, when rotated, to move the shifter longitudinally, a third friction member arranged for rotative movement between the first and second friction members, a spring abutment, a pressure spring bearing against said abutment, means normally taking up spring pressure without substantial effect upon the friction members and means acting upon relative movement of certain of the friction members to render the spring active and apply its pressure to the friction members.

7. A vehicle shock absorber or spring retarder comprising a friction member, a spindle member thereon, a shifter mounted for movement on the spindle member, a second friction member mounted for partial rotation and co-operating with said shifter and adapted, when rotated, to move the shifter longitudinally, a third friction member arranged for rotative movement between the first and second friction members, a yielding pressure means adapted to exert yielding pressure against the shifter when so moved longitudinally, and a controlling yielding means acting on said second friction member.

8. A shock absorber or spring retarder for vehicles comprising a main friction plate, a spindle thereon, a shifter having screw thread engagement with the spindle, a second friction plate arranged for rotative movement and having splined connection with the shifter, a third friction plate arranged between and having frictional engagement with the first and second plates, and a pressure spring adapted to resist longitudinal movement of the shifter.

9. A vehicle spring controlling appliance, comprising relatively movable friction members, yieldable means for exerting pressure upon said members, and means including inclined elements controlled by movement of one of the friction members for causing said yieldable means to exert a friction effect in one direction of movement, and for eliminating the friction effect of the spring in the other direction of movement.

10. A vehicle spring controller comprising relatively revoluble main friction members adapted to be connected to two vehicle parts such as the frame and axle, a shifter adapted for axial movement, a revoluble pressure member frictionally oprated by one of said main friction members, means including an inclined element for moving the shifter axially upon rotative movement of the pressure member, yieldable pressure means for applying friction pressure to the friction surfaces through the pressure member upon substantially rotary movement of the pressure member in one direction, and means for taking up the pressure effect of said pressure means to render said means inactive to produce friction pressure when the pressure member moves substantially in the other direction.

11. A vehicle spring controller comprising relatively revoluble main friction members adapted to be connected to two parts of a vehicle such as the frame and axle, a pressure member frictionally operated by one of said main friction members, a revoluble and axially movable shifter connected to rotate with the pressure member, means including an inclined element for moving the shifter axially when it is rotated, yieldable pressure means for applying pressure to the friction surfaces through the pressure member when the latter rotates in one direction, means normally taking up the pressure effect of said pressure means without creating pressure on the friction surfaces, and means for locking the shifter against further rotation after it has rotated a substantial distance with the pressure member in the direction which stresses the pressure means to apply pressure to the friction surfaces.

12. A vehicle spring controlling appliance comprising relatively movable friction members, a spring constantly exerting pressure upon said members, another spring and means controlled by movement of one of the friction members for causing said other spring to exert a friction effect in one direction of movement and for eliminating the friction effect of the spring in the other direction of movement.

13. A vehicle spring controlling appliance comprising relatively movable friction members, a spring constantly exerting pressure upon said members, another spring and means including inclined elements controlled by movement of one of the friction members for causing said other spring to exert a friction effect in one direction of movement and for eliminating the friction effect of the spring in the other direction of movement.

14. A vehicle spring controlling mechanism comprising two relatively rotatable friction members, a spring arranged to constantly urge said members into frictional engagement, another spring and means controlled by movement of one of the friction members serving to eliminate the effect of said other spring in one direction of movement and to cause application of the effect of said other spring in the other direction of movement.

15. A vehicle spring controlling mechanism comprising two relatively rotatable friction members, a spring arranged to constantly urge said members into frictional engagement, another spring and means including fixed and relatively movable inclined members controlled by movement of one of the friction members serving to eliminate the effect of said other spring in one direction of movement and to cause application of the effect of said other spring in the other direction of movement.

16. An appliance of the class described comprising a main plate, a pressure plate, a third plate arranged to oscillate between the main plate and the pressure plate, a spring arranged to constantly exert pressure tending to urge the plates to frictional contact, spring abutments, a second spring normally exerting a self-contained pressure between the abutments, and means actuated by rotary movement of the pressure plate in one direction for moving one of the spring abutments and causing the spring pressure to be applied to urge the plates to frictional engagement.

17. An appliance of the class described comprising a first friction plate, a pressure plate, a third plate arranged to oscillate between the main plate and the pressure plate, a spring arranged to constantly exert pressure urging the plates to frictional contact, a second spring normally exerting a self-contained pressure, and means including inclined surfaces actuated by rotary movement of the pressure plate in only one direction for causing the spring pressure to be applied to urge the plates to frictional engagement.

18. A vehicle spring controlling appliance comprising a main plate having a spindle provided with a screw thread, a nut engaging the screw thread, a pressure plate having slidable engagement with the nut, a relatively rotatable friction plate between the main plate and the pressure plate, a spring constantly acting between the main plate and the pressure plate tending to urge them together, another spring, abutments between which said other spring normally exerts a self-contained thrust, and means actuated by the nut for causing the thrust of said other spring to be applied to urge the plates together.

19. A vehicle spring controlling appliance comprising a main plate having a sleeve provided with an external screw thread, a nut engaging the screw thread, a pressure plate having splined engagement with the nut, a relatively rotatable friction plate between the main plate and the pressure plate, a spring constantly tending to urge the main plate and the pressure plate together, another spring, abutments between which said other spring normally exerts a self-contained thrust, and means actuated by the nut in only one direction of friction plate movement for causing the thrust of said other spring to be applied to urge the plates together.

20. A shock absorber or spring retarder for vehicles comprising a main friction plate, a pressure plate, a friction plate oscillatably mounted between the main plate and pressure plate, a movable member having an inclined surface cooperating with an inclined surface in fixed relation to the main plate, said member also having a movable connection with the pressure plate, a spring, and means actuated by movement of said movable member when frictionally impelled by the pressure plate to take up the thrust of said spring without operative effect in one direction of movement and to apply the thrust of the spring to squeeze the friction plate between the main and pressure plates in the other direction of movement.

21. A shock absorber or spring retarder for vehicles comprising a main friction plate, a pressure plate, a friction plate oscillatably mounted between the main plate and pressure plate, a movable member having an inclined surface cooperating with an inclined surface in fixed relation to the main plate, said member also having a movable connection with the pressure plate, a spring, and means actuated by movement of said movable member when frictionally impelled by the pressure plate to take up the thrust of said spring without operative effect in one direction of movement and to apply the thrust of the spring to squeeze the friction plate between the main and pressure plates in the other direction of movement, and another spring arranged to exert pressure constantly tending to apply friction to said friction plate.

22. A shock absorber or spring retarder for vehicles comprising a main friction plate, a pressure plate, a friction plate oscillatably mounted between the main plate and pressure plate, annular friction rings secured to opposite surfaces of said friction plate, a movable member having a screw thread cooperating with a screw thread in fixed relation to the main plate, said member also having a spline connection with the pressure plate, a thrust-spring, and means actuated by movement of said movable member when frictionally impelled by the pressure plate to take up the thrust of said spring without effect upon the plates in one direction of movement and to apply the thrust of the spring to squeeze the friction plate between the main and pressure plates in the other direction of movement.

23. A shock absorber or spring retarder for vehicles comprising a main friction plate, a pressure plate, a friction plate oscillatably mounted between the main plate and pressure plate, annular friction rings secured to opposite surfaces of said friction plate, a movable member having a screw thread cooperating with a screw thread in fixed relation to the main plate, said member also having a spline connection with the pressure plate, a thrust-spring, and means actuated by movement of said movable member when frictionally impelled by the pressure plate to take up the thrust of said spring without effect upon the plates in one direction of movement and to apply the thrust of the spring to squeeze the friction plate between the main and pressure plates in the other direction of movement, and another spring arranged to exert pressure constantly tending to apply friction to said friction plate.

24. In an appliance of the class described, a base plate, a hollow spindle integral therewith and having an external thread, a nut revolving on the spindle in engagement with its thread, a friction plate arranged for axial movement and secured against rotative movement relative to the nut, a friction plate oscillatably mounted about the spindle between the main and pressure plates, a spring abutment within the spindle and connection therefrom to the pressure plate, a spring constantly acting between the spring abutment and a member of the spindle, another spring acting against the spring abutment and arranged to exert pressure against the nut, both of the springs being housed substantially within the spindle.

25. In an appliance of the class described, a base plate, a hollow spindle integral therewith and having an external thread, a nut revolving on the spindle in engagement with its thread, a friction plate arranged for axial movement and secured against rotative movement relative to the nut, a friction plate oscillatably mounted about the spindle between the main and pressure plates, a spring abutment within the spindle and an adjustable connection therefrom to the pressure plate, a spring constantly acting between the spring abutment and a member of the spindle, another spring acting against the spring abutment and arranged to exert pressure against the nut, both of the springs being housed substantially within the spindle, movement of the nut being checked in one direction by contact with a member connected to the pressure plate and in the other direction by engagement with the spindle with a certain range of free movement between the two positions.

26. A vehicle spring controlling appliance comprising a main plate having a central sleeve member provided with an external screw thread and also having an inwardly projecting flange, a nut engaging the screw thread and having an inwardly projecting flange located above the sleeve flange, a pressure plate having splined engagement with the nut, a friction plate arranged for oscillation about the sleeve between the main plate and the pressure plate, a spring abutment within said sleeve, a spring bearing at one end against said abutment and at the other end against said sleeve flange, another spring bearing at one end against said abutment and arranged to exert its pressure against the nut, and means connecting said spring abutment to said pressure plate so that the thrust of the first named spring is constantly exerted to urge the main and pressure plates convergently, and the thrust of the second named spring is self-contained and ineffective in one direction of movement of the friction plate and is exerted to urge the main plate and pressure plate convergently in the other direction of movement of the friction plate.

27. A vehicle spring controlling appliance comprising a main plate having a central integral sleeve member provided with an external screw thread and also having an inwardly projecting flange, a nut engaging the screw thread and having an inwardly projecting flange located above the sleeve flange, a washer engaging said nut flange, a pressure plate having splined engagement with the nut, a friction plate arranged for oscillation about the sleeve between the main plate and the pressure plate, a spring abutment within said sleeve, a spring bearing at one end against said abutment and at the other end against said sleeve flange, another spring bearing at one end against said abutment and at the other against said washer, a cap member connected to said pressure plate and a connection between said cap member and said spring abutment, the parts constructed and arranged so that the thrust of the first named spring is constantly exerted to urge the main and pressure plates convergently and the thrust of the second named spring is self-contained and ineffective in one direction of movement of the friction plate and is exerted to urge the main plate and pressure plate convergently in the other direction of movement of the friction plate.

28. In a shock absorber or spring check for vehicles, a first friction plate, a second relatively oscillatable friction plate, a pressure member arranged to cause application of retarding friction to the second plate, a first spring constantly exerting thrust tending to urge the pressure member to frictional engagement, a second thrust spring, abutments therefor, and an inclined actuating member in non-rotative relation to the first plate and cooperating with the pressure member and one of the spring abutments so that the pressure member is actuated by frictional engagement with the second plate when the latter is moved in either direction from any operative position, and both springs and the inclined member cooperate to apply a maximum frictional retarding effect to the second plate in one direction of movement, and the thrust of the second spring is taken up by the abutments without pressure-effect on the pressure member and the first spring exerts a reduced retarding effect, in the other direction of movement.

Signed at New York in the county of New York and State of New York this 31st day of January A. D. 1923.

HAROLD D. CHURCH.